United States Patent Office 3,456,172
Patented July 15, 1969

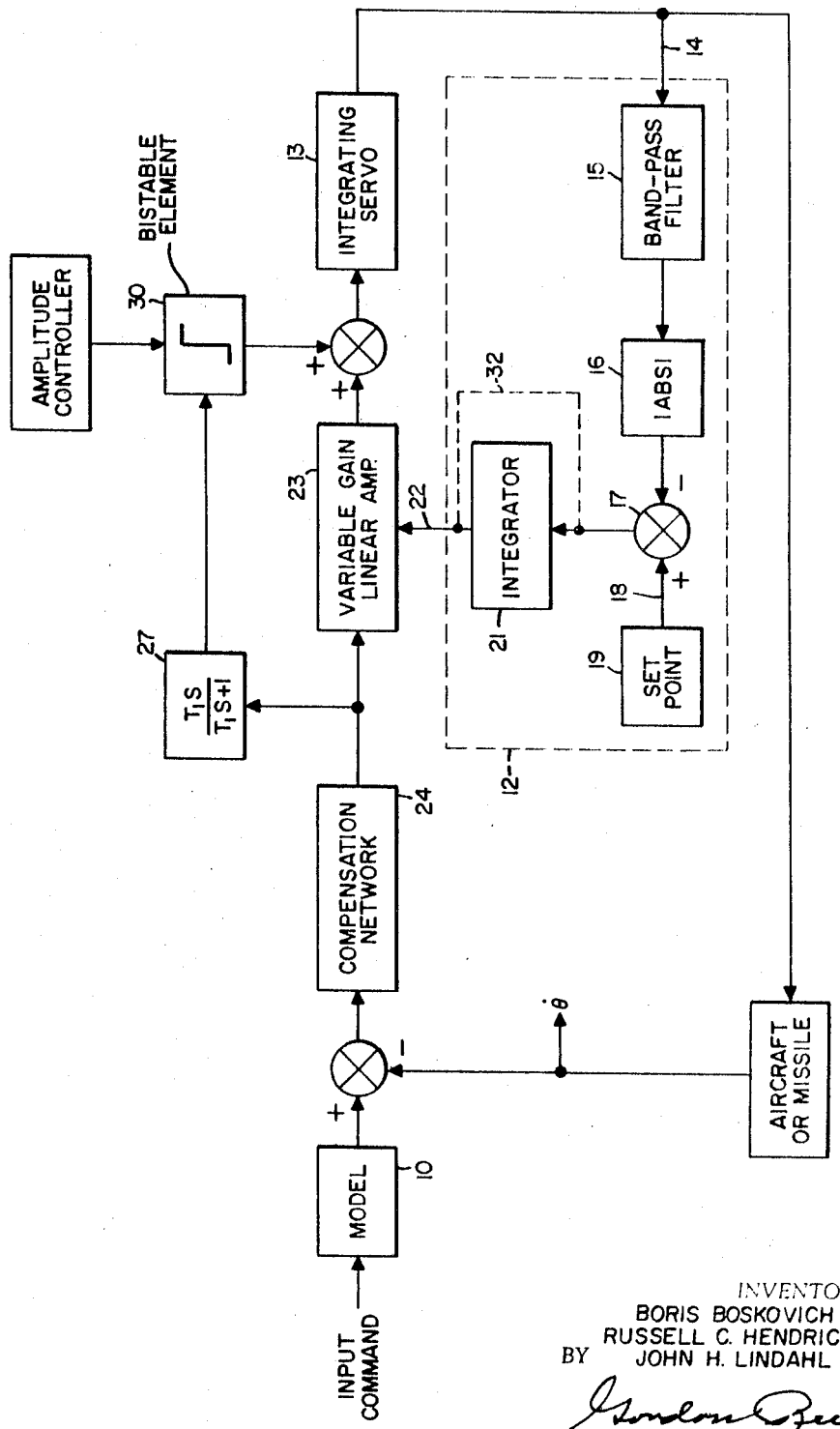

3,456,172
AUTOMATIC CONTROL APPARATUS FOR AIRCRAFT
Russell C. Hendrik, Fridley, Boris Boskovich, St. Anthony Village, and John H. Lindahl, Wayzata, Minn., assignors to Honeywell Inc., Minneapolis, Minn., a corporation of Delaware
Filed Aug. 18, 1965, Ser. No. 480,646
Int. Cl. G05b *11/00;* B64c *13/50, 13/00*
U.S. Cl. 318—18                                14 Claims

ABSTRACT OF THE DISCLOSURE

An adaptive type of control system has two arrangements for controlling the gain of the system. One gain control arrangement is of the type that uses a linear amplifier that receives an error signal. The error signal is a measure of the difference between a desired performance and the actual performance of apparatus which includes the control system. The amplifier directly operates a servo motor that controls the condition, with the amplifier having its gain varied in accordance with the control system deviation from a desired magnitude of oscillation, which magnitude of oscillation represents the desired performance of the control system.

The other gain control arrangement is of the type which on operating applies full power in one direction or the other to the servo motor in response to the presence of an error signal relating performance operation deviation of the apparatus from a desired performance.

---

This invention pertains to improvements in control apparatus for dirigible craft such as aircraft. More particularly this invention relates to improvements in control apparatus of the self-adaptive type having automatically adjusting operating features. The self-adaptive control apparatus to which the invention relates may be of the type disclosed in U.S. Patent 3,057,584 to R. N. Bretoi dated Oct. 9, 1962, or U.S. Patent 3,137,462 to R. C. Hendrick dated June 16, 1964.

Two objectives of many automatic flight control systems of aircraft are to provide uniform responses of the craft to pilot commands and adequate damping of external disturbances throughout the flight envelope of the craft. In conventional automatic flight control systems for high performance aircraft, control system gain and time constants are generally scheduled with air data such as dynamic pressure, Mach number, and altitude.

A self-adaptive system of the type referred to in the patent above, does not use this type of information supplied in conventional aircraft but operates solely or signals generated within the control system or derived from the output of sensors such as gyros or accelerometers. Such signals generally are angular rates and control servo motions. In some instances, normal and lateral acceleration signals are also used.

The inner loop of the adaptive automatic pilots of the type referred to consists fundamentally of a tight feedback system controlling a selected parameter of aircraft motion, called the controlled variable. This parameter is selected to facalitate the use of whatever outer loops are to be included in the aircraft, and ideally the variable should be one such that the reltionship between the inner and outer loop parameters does not change with flight condition. Thus if pitch and roll attitude hold are to be used as outer loops, the desirable inner loop parameters are pitch rate and roll rate.

If the adaptive control apparatus is to control the aircraft about it pitch axis and pitch rate is the controlled variable, the desired action of the control system is to force the controlled aircraft variable, pitch rate in this case, to follow the output of a model as closely as possible. This can be accomplished if the frequency band width of the inner loop exceeds that of the model by a factor of three or more. If necessary band width can be achieved by series lead compensation and high forward loop gains.

In the systems referred to, an automatic gain changer was provided. This gain changer had two control inputs, one from a set point and the other from operation of the servo. The signal due to the servo operation is compared with the set point signal which represents a desired limit cycle amplitude of the combined self-adaptive control system-aircraft. The error between the two signals is fed into the integrator to adjust the gain of the self-adaptive control apparatus. If a limit cycle does not exist or if its amplitude be less than that called for by the set point, the integrator would act to increase the gain until the desired limit cycle amplitude is established.

When such gain changer is operated with a control loop containing negligible non-linearities around null, it is capable of maintaining a uniform limit cycle at the set point amplitude. However, most practical flight control apparatus hardware or mechanization actually and in practice has finite non-linearities around the null point. These non-linearities result in cyclic gain changing action. This results in a gain controller instability due to small amplitude system non-linearities such as back lash and dead spot.

An object therefore of this invention is to provide an improved self-adaptive control apparatus incorporating improvements of adaptation speed and stability.

A further object of this invention is to provide a novel gain controller arrangement for a self-adaptive autopilot which gain controller arrangement combines features having linear variations in gain and bistable variations in gain.

It is a further object of this invention to provide in a self-adaptive control system a gain controller arrangement having a linear variable gain element and a bistable element in combination.

The above and other objects of the invention will become apparent upon consideration of the following description taken in connection with sub-joined joints disclosing an embodiment thereof.

Referring to the drawings:

The sole figure is a block diagram of the prior adaptive control system modified by the inclusion of the bistable supplemental gain control.

Referring to the figure and concerning ourselves initially with that portion of the adaptive system therein corresponding with the self-adaptive system in Bretoi 3,057,584, the self-adaptive flight control system is designed to give essentially uniform response to commanded input in spite of large changes in the dynamic characteristics of the aircraft being controlled, such dynamic characteristics being affected by air speed, dynamic pressure, altitude.

The desired response to commands is established by a model 10, which shapes all commands to the control system inner loop. The model is generally a second-order lag in the pitch axis and a first order lag in the roll axis. It has been established that the overall response will be identical to that of the model if the band width of the adaptive inner loop exceeds the model band width by at least a factor of 3.

The band width of the adaptive system is significantly larger than that which is generally found in conventional linear systems wherein the servo operation rate is proportional to the magnitude of the error signal. This is accomplished primarily by operating the system at or near the highest loop gain (critical gain) possible. Safe operation at critical gain is accomplished through the adaptive gain changer loop.

In the figure an adaptive gain changer 12 controls the autopilot gain by forcing the control system (aircraft plus adaptive control system) to exhibit a small ampltiude residual motion. This residual motion or limit cycle exists wherever critical gain exists. This limit cycle is detected at the output of the servo 13. A servo follow-up signal supplied over conductor 14 to a band pass filter is filtered in the band pass filter 15 which is mechanized to pass the four cycles per second limit cycle frequency. The output from the band pass filter 15 is supplied to a rectifier 16 and after being rectified it is applied to a summing device 17 where it is summed against a selected voltage reference supplied over conductor 18. The output from summing device 17 corresponding to the limit cycle amplitude error is then supplied to integrator 21, and the output from integrator 21 is supplied through conducting means 22 to variable gain device 23. Thus the variable gain is a function of the integrator output. The system gain will increase as long as the output of the band pass amplifier 15 is less than the voltage reference on conductor 18.

The limit cycle frequency of the servo 13 is maintained at about 4 cycles per second through the use of the compensation network 24 which includes a rate lead network. Such phase compensation provides a wide band width to the system and changes in the actual aircraft flight characteristics are insignificant in determining the limit cycle frequency. While this frequency of four cycles per second along with the small amplitude of the chatter makes it generally not detectable by the pilot, the rate gyro on the aircraft can easily detect this motion. The output, $\theta$, of the rate gyro is also reflected in the operation of the servo motor, and consequently the limit cycle frequency is taken from operation of the servo motor rather than from the rate gyro response. This servo motion is limited by gain changer 12 to a value below the threshold of motion that can usually be detected by the pilot of the craft.

As stated, when operated with a control loop containing negligible non-linearities around null, the automatic gain changer 12 is capable of maintaining a uniform limit cycle at the set point amplitude. Most practical flight control hardware has finite non-linearities around the null point, such as back lash and dead spot or lost motion. These non-linearities can result in cyclic gain changing action. For example without backlash or dead spot or lost motion, at summing device 17, the rectified output voltage from device 16 in the steady state would equal the set point voltage on conductor 18. However with back lash, lost motion, or dead spot present non-linearity exists. The cyclic action of the gain changer with backlash or dead spot is an extremely involved process.

Some insight to the problem can be gained by considering the non-linearity as an amplitude-dependent variable gain element. At zero input amplitude, the non-linearity has zero gain; while at an infinite input amplitude the non-linearity has unity gain (as is no longer existent). As the gain changer increases the system gain, to try and achieve critical, therefore, it can never reach critical if there are no disturbances into the control loop to effect some finite signal passage through the non-linearity. Consequently during quiescent periods the gain tends to overshoot that value which would be required to sustain a limit cycle at the set amplitude. At this "overshot" condition, any significant disturbance which exceeds the non-linearity zone immediately causes the effective "gain" of the non-linearity to increase, and a burst of limit cycle oscillation occurs which generally exceeds both the non-linearity zone and the set point amplitude. Hence the gain is now driven down below the final value because the high oscillation amplitude momentarily increased the "gain" of the non-linearity.

This cyclic action can continue or eventually be damped out, depending on the size of the non-linearity relative to the limit cycle set amplitude. It should be noted, however, that a stable condition can be reached even with a non-linearity wherein the gain changer is satisfied. In other words, the voltage on conductor 18 calls for an increase in gain of device 23 whereas the output of rectifier 16 calls for a decrease. The output of rectifier 16 in this situation is decreased in accordance with the magnitude of the lost motion or dead spot. Thus, whereas the output of rectifier 16 would equal that on the conductor 18, without back lash, it is now less than the voltage on conductor 18 with the result that the integrator operates to increase the gain on variable gain device 23. Increasing the gain, increases the servo limit cycle amplitude.

Thus an unstable condition can result in the gain changer for lost motion, dead spot, or backlash in the system. Such instability may also result from other causes that have a similar effect.

To improve the stability of the gain changer and the adaptive system and also provide improvement in adaptation speed, the gain controller 12 has been augmented in the novel arrangement herein with a bistable element 30 such as a relay or other bistable device.

It is evident from the figure that the variable gain device 23 of the gain controller 12 is paralleled by the improvement comprising a high pass network and bistable element combination. This combination comprises a high pass device 27 and a bistable element 30. The high pass device may, in a DC voltage system, consist of a resistor-capacitor arrangement. The bistable device 30 operates somewhat as a relay in that for control signals applied thereto it has a full output in one or the other directions for corresponding input polarities.

The output from bistable device 30 will command a rate of operation of the integrating servo motor in one or the other directions at a rate determined by the magnitude of the output of the bistable device. The output of the bistable device 30 for even small signals thereto is as great as for large signals thereto. Thus the gain of the bistable device such as output to input is high at low magnitudes of input signals but low at large input signals.

On the other hand, the output of the variable gain amplifier 23 varies in accordance with the magnitude of the input signals applied thereto.

In the arrangement contemplated, the amplitude of the output of the bistable element 30 is such hat one half the called for limit cycle amplitude is achieved thereby, and the resulting gain of the variable gain element 23 is made equal to the effective gain of the bistable element 30. Consequently because the system is always at critical gain (for small error amplitude out of compensation network 24) through the action of the bistable element 30, the gain of the linear variable gain element 23 is maintained at 50% of the critical value.

The high pass device 27 prevents bistable saturation under continuous system error conditions which would disrupt the evaluation process. The time constant of the high pass device 27 would be set at one or two octaves below the limit cycle frequency.

Thus the low limit cycle amplitudes of the basic Bretoi system can be retained while gaining the stability and response advantages of the single bistable element 30.

The above combination of the variable gain amplifier 23 and its controller 12 along with the bistable element may be referred to by the term linear plus bistable control or LPB. The superior stability of the LPB gain controller is due to the following features:

(1) The bistable element tends to linearize small amplitude non-linearities thereby reducing their destabilizing effects on gain controller 12.

(2) The bistable element 30 forces a system limit cycle regardless of the magnitude of the linear variable gain element output. The effect of this continuous limit cycle in a reduction in order of the gain controller loop dynamics from two integrations to one integration. For example without the bistable element, an incremental gain change from the critical value causes a convergence or divergence in limit cycle amplitude, an effect which may be expressed approximately as an integration.

With the bistable element, however, an incremental change in the linear gain element results in a proportional change in limit cycle amplitude.

To obtain a well damped limit cycle control but without using bistable element 30, series lead compensation transmission means 32 in dashed line which parallels the integrator 21 in gain controller 12 is required. In other words the gain device 23 thereby is controlled in accordance with an integral plus a proportional arrangement provided respectively by integrator 21 and means 32. This lead effect due to the proportional control by means 32 can result however in a low frequency interaction between the adaptive system and the gain changer 12, manifested by gain oscillation between minimum and about 20% of critical. The use of the LPB gain controlled will eliminate the necessity for such series compensation means 32 in the gain control loop and hence avoid the interaction difficulty. By the same token faster gain controller response is possible.

It will now be apparent that there has been provided a novel linear plus bistable gain controller having an adaptive capability for rapidly varying gains in an adaptive system because of its superior stability as compared to prior adaptive controllers for an adaptive system.

What is claimed is:

1. In a self-adaptive control apparatus for a dirigible craft having a servo motor operating a condition control device of said craft and including a variable gain means receiving an error signal for controlling said servo motor, and limit cycle response means adjusting the gain of the variable gain means, in combination therewith a bistable device, in parallel with said variable gain means, responsive also to said error signal and augmenting the control of the servo motor.

2. The apparatus of claim 1 wherein the magnitude of the output of the bistable element is such that a portion of the called for limit cycle amplitude is achieved thereby.

3. In a self-adaptive control apparatus for an aircraft operable over wide ranges of air speed and altitudes said apparatus having a servo motor operating a control surface of the craft said servo motor being controlled by a variable gain means which receives an error signal for controlling said servo motor said variable gain being adjusted by limit cycle responsive means for adjusting the gain of the variable gain means, in combination a bistable device for augmenting the operation of the servo motor so that it moves in one direction or another depending upon the polarity of the error signal, whereby the control apparatus operates as crtical gain even for small error signals.

4. Control apparatus for a servo motor operating a control surface of an aircraft having wide ranges in air speed and altitude comprising:
    a variable gain device operating said servo motor;
    limit cycle responsive means affected by the effectiveness of the control surface at varying flight conditions such as air speed and altitude adjusting the variable gain device;
    a bistable device in parallel with said variable gain means and augmenting the control of the servo motor, said bistable device supplying an output that tends to move the servo motor in one direction or another, said variable gain device tending to cause operation of the servo motor at a rate or displacement varying with the magnitude of a control signal thereto.

5. Control means for a variable rate servo motor operating a condition control device in a self-adaptive control system:
    comprising a variable gain device linearly responsive to a variable signal voltage operating said servo motor;
    means responsive to a limit cycle resulting from operation of the servo motor for varying the gain of the variable gain device;
    a bistable device responsive to said signal voltage and having a fixed output irrespective of the magnitude of said signal, said bistable device thereby stabilizing the operation of the servo motor by the variable gain device despite lost motion in the servo motor.

6. The apparatus of claim 5 wherein a high pass network is placed between the bistable device and the source of signal voltage.

7. In an automatic pilot for an aircraft having a control surface and a closed loop system operating said surface, said closed loop system comprising an input voltage source, a follow-up voltage source responsive to a flight condition sensor, a linear amplifier having an output in accordance with the magnitude of an input signal thereto, and a servo motor operated by said amplifier in controlling operation of said surface, said amplifier being responsive to an error voltage derived from the difference of the input and follow-up voltage:
    means for controlling the gain of the closed loop system to maintain its operation close to the neutral stability point of the closed loop system;
    further means responsive to the amplitude of a limit cycle resulting from operation of the servo motor, varying the gain of said amplifier; and
    a bistable device in parallel with said amplifier and additionally operating said servo motor, said bistable device being responsive to the error voltage.

8. In an automatic condition control apparatus having a condition changing device and a closed loop system operating said device, comprising:
    an input signal source, a follow-up signal source responsive to a function of a change in said condition, further means comprising an amplifier responsive to an error signal derived from the difference of said input signal and follow-up signal, means for linearly controlling the output of said amplifier in accordance with said error signal, additional means controlling said servo motor from said error signal said additional means comprising a high pass device and a bistable device in series, and means responsive to cyclic motions resulting from operation of the servo motor adjusting the gain of said amplifier.

9. The apparatus of claim 8 wherein the input signal source is derived from a model and wherein the signal developed by the model is in accordance with a desired change in the condition.

10. In control apparatus for an aircraft having a control surface for applying a variable control moment about the axis of the craft and a servo motor operating said surface at various rates, in combination:
    a source of control signal;
    a model responsive to said signal and developing an output signal in accordance with a desired response of the craft to such control signal;
    a craft flight condition responsive means developing a third signal in accordance with said flight condition resulting from operation of said surface;
    means combining said model output signal and third signal;
    a control means responsive to said combining means controlling said servo motor;
    means responsive to residual motion resulting from operation of said servo motor at a predetermined frequency and developing a fourth signal;
    means providing a fifth signal;
    summing means obtaining the difference of said fourth and fifth signls;
    further means controlled by said summing means and adjusting the gain of said control means to vary the gain of said control means to maintain the forward loop gain of the control apparatus at the high stable value for all flight conditions of said aircraft; and a bistable element means in parallel with said control means and controlling said servo motor, said bistable means being responsive to said combining means.

11. The apparatus of claim 10 wherein means are included that provides for controlling the amplitude of the residual motion at the predetermined frequency from the bistable means and the control means.

12. In a self-adaptive control system that operates a control surafce of an aircraft having a wide range of air speed and altitudes whereby the control surface effectiveness is substantially uniform, a gain changing arrangement for said adaptive system for providing said uniform response of the aircraft to commanded inputs comprising a first controller for the servo motor that operates the surface, said first controller having its gain varied in accordance with the difference between a selected voltage and a signal derived from limit cycle oscillations of the servo motor, and a second controller comprising a bistable means responsive to the commanded input and controlling the rate of operation or displacement of the servo motor at a fixed rate irrespective of the magnitude of the commanded signal.

13. The apparatus of claim 12 wherein the limit cycle amplitude is determined jointly by the magnitude of the output of the bistable element, the called for limit cycle amplitude, and the actual limit cycle amplitude.

14. In a self-adaptive control system, that operates a control surface of an aircraft having a wide range of air speed and altitudes whereby the control surface effectiveness is normally not uniform, a gain changing arrangement for said adaptive system for providing uniform response of the aircraft to a commanded input comprising a first controller in said control system which operates the servo motor at a rate linearly varying with the magnitude of the commanded input, and a second controller of the bistable type which operates the servo motor at a fixed rate irrespective of whether the commanded input is large or small, said bistable device forcing a system limit cycle frequency that is detected by the second controller and which is used to adjust the gain of the system.

References Cited

UNITED STATES PATENTS

| | | |
|---|---|---|
| 3,030,054 | 4/1962 | Lee et al. |
| 3,057,584 | 10/1962 | Bretoi _____ 318—489 XR |
| 3,137,462 | 6/1964 | Hendrick. |
| 3,221,229 | 11/1965 | Kezer et al. |

BENJAMIN DOBECK, Primary Examiner

U.S. Cl. X.R.
244—77; 318—28